United States Patent
Eyhorn et al.

(10) Patent No.: US 6,773,618 B2
(45) Date of Patent: Aug. 10, 2004

(54) MICROPOROUS THERMAL INSULATION MOLDING CONTAINING ELECTRIC-ARC SILICA

(75) Inventors: Thomas Eyhorn, Altusried (DE); Andreas Rell, Waltenhofen (DE)

(73) Assignee: Wacker Chemie GmbH, München (DE)

( * ) Notice: Subject to any disclaimer, the term of this patent is extended or adjusted under 35 U.S.C. 154(b) by 0 days.

(21) Appl. No.: 10/269,318

(22) Filed: Oct. 11, 2002

(65) Prior Publication Data

US 2003/0080313 A1 May 1, 2003

(30) Foreign Application Priority Data

Oct. 18, 2001 (DE) .......................................... 101 51 479

(51) Int. Cl.⁷ ................................................. F16L 59/00
(52) U.S. Cl. ........................ 252/62; 501/154; 501/133; 501/80; 219/531; 219/460
(58) Field of Search ................................. 219/531, 460; 252/62; 501/154, 133, 80

(56) References Cited

U.S. PATENT DOCUMENTS

| | | |
|---|---|---|
| 4,985,163 A | 1/1991 | Kratel et al. |
| 5,556,689 A | 9/1996 | Kratel et al. |
| 6,191,122 B1 | 2/2001 | Lux et al. |
| 2002/0197464 A1 | 12/2002 | Kicherer et al. |

FOREIGN PATENT DOCUMENTS

WO    01109057    2/2001

*Primary Examiner*—C. Melissa Koslow
(74) *Attorney, Agent, or Firm*—Collard & Roe, P.C.

(57) ABSTRACT

A thermal insulation molding having a density of 150–500 kg/m³, includes a thermal insulation material, containing 5%–75% by weight of pyrogenic silica (HDK), 5%–50% by weight of electric-arc silica, 5%–50% by weight of opacifier, wherein the electric-arc silica has a bulk density of <200 kg/m³, a carbon content of <0.1% by weight, an alkali metal oxide content of <0.2% by weight, an alkaline-earth metal oxide content of <0.3% by weight, an $SO_3$ content of <0.05% by weight and a specific surface area of >30 m²/g.

11 Claims, No Drawings

MICROPOROUS THERMAL INSULATION MOLDING CONTAINING ELECTRIC-ARC SILICA

BACKGROUND OF THE INVENTION

1. Field of the Invention

The present invention relates to a microporous thermal insulation molding comprising compressed thermal insulation material containing finely divided metal oxides in the form of pyrogenic silica (HDK) and electric-arc silica, as well as opacifiers, fibers and additives.

2. Field of the Invention

Such microporous thermal insulation moldings are known and described, for example, in U.S. Pat. No. 4,985,163.

The finely divided metal oxides preferably used in such microporous thermal insulation moldings are pyrogenic silicas including electric-arc silicas, precipitated silicas or silicon dioxide aerogels and also analogously prepared aluminum oxides and mixtures thereof. To achieve good thermal insulation properties these finely divided oxides possess very high specific surface areas which preferably lie in the range of 50–700 $m^2/g$ (measured by BET). As a result of these large surface areas, these oxides have a very strongly pronounced ability to adsorb polar substances. As is known, they therefore act as very effective drying agents and in the natural atmosphere readily take up water. Accordingly, the same behavior is shown by the microporous thermal insulation moldings produced therefrom. In practice, therefore, moisture absorption by the microporous heat insulation moldings can occur during storage and this absorption cannot be prevented. If in practical use these microporous thermal insulation moldings are now exposed to high thermal energy within a short time period, there is explosive formation of steam which destroys the structure of the thermal insulation molding. This effect occurs, for example, in microporous thermal insulation moldings used as thermal insulation in radiative heating units for ceramic hotplates, if these radiative heating units are brought to red heat by means of the customary resistance heating elements at customary intervals of preferably from 1 to 8 seconds.

It is known from EP 618399 (corresponds to U.S. Pat. No. 5,556,689) that the moisture which is taken up by commercially available thermally insulating shaped parts can be discharged as steam by means of defined channel pores without the molding being destroyed.

WO 01/09057 (applicant Ceramaspeed) describes thermal insulating moldings with an electric-arc silica content of 10% to 99.5% by weight and a carbon content of 0.5–6% by weight. The shaped part is hardened during a heat treatment step which takes place at over 400° C. It is stated on page 2, lines 10–14 of this application that, at a comparable density, the pressed parts comprising electric-arc silica are softer than parts without electric-arc silica. This is compensated for by hardening on the basis of the carbon content.

SUMMARY OF THE INVENTION

It is an object of the present invention to provide a thermal insulation molding comprising compressed thermal insulation material containing finely divided metal oxides in the form of pyrogenic silica (HDK®) and electric-arc silica and an opacifier, which has a considerably lower water absorption yet maintains the good thermally insulating, mechanical and electrically insulating properties of known thermal insulation moldings.

The trademark HDK® is applied to a product the main ingredient of which is pyrogenic silica.

The above object is achieved by a thermal insulation molding having a density of 150–500 $kg/m^3$, comprising a thermal insulation material, containing 5%–75% by weight of pyrogenic silica (HDK®), 5%–50% by weight of electric-arc silica, 5%–50% by weight of opacifier, wherein the electric-arc silica has a bulk density of <200 $kg/m^3$, a carbon content of <0.1% by weight, an alkali metal oxide content of <0.2% by weight, an alkaline-earth metal oxide content of <0.3% by weight, an $SO_3$ content of <0.05% by weight and a specific surface area of >30 $m^2/g$. Each percent by weight is based upon the total weight of the thermal insulation molding.

The electric-arc silica preferably has a bulk density of 70 $kg/m^3$ to 190 $kg/m^3$, a carbon content of 0% to 0.05% by weight, an alkali metal oxide content of 0.02% to 0.18% by weight, an alkaline-earth metal oxide content of 0.05% to <0.3% by weight, an $SO_3$ content of 0% to <0.05% by weight and a specific surface area of >30 to 48 $m^2/g$. Each percent by weight is based upon the total weight of the thermal insulation molding.

The thermal insulation molding according to the invention preferably also contains 0%–10% by weight of inorganic fiber material, 0%–5% by weight of organic fiber material, 0%–30% by weight of additives and 0%–2% by weight of inorganic binders. Each percent by weight is based upon the total weight of the thermal insulation molding.

The thermal insulation material preferably consists of the materials which have been listed herein.

It is particularly preferable for the thermal insulation molding to have a density of 200–450 $kg/m^3$ and to consist of 10%–70% by weight of pyrogenic silica (HDK®), 10%–40% by weight of electric-arc silica, 10%–45% by weight of opacifier, 1%–7% by weight of inorganic fiber material, 0%–4% by weight of organic fiber material, 0%–20% by weight of additives and 0%–1% by weight of inorganic binder. Each percent by weight is based upon the total weight of the weight of the thermal insulation molding.

It is especially preferred for the thermal insulation molding to have a density of 250–400 $kg/m^3$ and to consist of 15%–60% by weight of pyrogenic silica (HDK®), 15%–30% by weight of electric-arc silica, 20%–40% by weight of opacifier, 2%–5% by weight of inorganic fiber material, 0–3% by weight of organic fiber material, 5%–15% by weight of additives and 0%–0.7% by weight of inorganic binder. Each percent by weight is based upon the total weight of the thermal insulation molding.

Standard electric-arc silicas, e.g. Elkem Norway Microsilica 983 and 971 produced by Elkem (4675 Kristiansand, Norway), or Supersil produced by Zirkon-Mineral GmbH (Erftstadt), or Microfume A produced by Pechiney (Düsseldorf) and similarly produced $Al_2O_3$-rich products, such as "RW-Aloxil" produced by RW Silicium GmbH (Pocking), have a carbon content of >0.6% by weight and a bulk density of greater than 300 $kg/m^3$ (typically >400 $kg/m^3$) (e.g. WO 01/09057 p. 2 lines 32 ff.).

Surprisingly, it has been found that a molding which contains a chemically very pure electric-arc silica with a bulk density of <200 $kg/m^3$ has a reduced tendency to absorb water. The use of this electric-arc silica, which partially replaces the HDK® in the standard thermal insulation molding, allows the production of thermal insulation moldings according to the invention by means of a useful production process. Their density is no higher than that of conventional thermal insulation moldings and they satisfy the high demands imposed on the thermal properties of thermal insulation moldings. The mechanical properties and high-temperature properties such as shrinkage required of thermal insulation moldings are also achieved. Although up to 50% by weight of the HDK® which is customarily used has been substituted by the selected electric-arc silica having the properties mentioned, no difference between the thermal insulation molding according to the invention and conventional thermal insulation moldings was found, except that the water absorption by the inventive material is reduced.

The thermal insulation moldings according to the invention usually have the following characteristic variables:
flexural strength >0.15 N/mm$^2$;
compressive strength >1.0 N/mm$^2$;
coefficient of thermal conductivity <0.025 W/mK; and
electrical resistance >2000 MΩ.

The use of electric-arc silica to produce thermal insulation moldings is already known in the prior art. However, the use of electric-arc silica in addition to precipitated silicas, etc. is generally mentioned as a suitable material, but electric-arc silica is never preferably used. Electric-arc silicas generally have high levels of alkali metal, alkaline-earth metal and soot/carbon impurities. Moreover, they usually have very high bulk densities. The use of this electric-arc silica does not lead to improved properties in the moldings produced. The following table compares a standard electric-arc silica with the electric-arc silica which is present in the molding according to the invention.

|  | Standard | Invention |
|---|---|---|
| Bulk density kg/m$^3$ | >300 | <200 |
| Carbon % by wt. | 0.5–6.0 | <0.1 |
| Alkali metal oxides % by wt. | >0.2 | <0.2 |
| Alkaline-earth metal oxides % by wt. | >0.4 | <0.3 |
| SO$_3$ % by wt. | >0.1 | <0.05 |
| Specific surface area m$^2$/g | <25 | >30 |

The advantages which according to the invention are achieved by the use of the selected electric-arc silica are not found in the prior art and are also not made obvious by the prior art.

Preferably pyrogenically produced silica with a BET specific surface area of 50–700 m$^2$/g, particularly preferably of 70–400 m$^2$/g, is used to produce a molding in accordance with the invention. A pyrogenically produced silica of this type is available, for example, under the name HDK® S13-T30 from Wacker-Chemie GmbH, Munich.

Examples of opacifiers are ilmenite, rutile, titanium dioxide, silicon carbide, iron mixed oxides, iron(II)/iron(III) mixed oxide, chromium dioxide, zirconium oxide, manganese dioxide, iron oxide, silicon dioxide, aluminum oxide and zirconium silicate, and mixtures thereof. It is preferable to use silicon carbide, rutile, ilmenite and zirconium silicate. It is particularly preferable to use silicon carbide. The opacifiers advantageously have an absorption maximum in the infrared region between 1.5 and 10 μm.

Examples of organic fiber materials are viscose and cellulose.

Examples of inorganic fiber materials are ceramic fibers, soluble ceramic fibers, preferably textile glass fibers with a diameter of >5 μm, such as Asil fibers, Belcotex fibers, silica fibers, E, R, S2 or similar fibers.

Examples of additives are mica, perlite, vermiculite, fly ashes, low-alkali precipitated silicas, Al$_2$O$_3$, pyrogenically produced aluminum oxide, silicon oxide aerogels.

All binders whose use in microporous thermal insulation moldings is known can be used as inorganic binders. Examples of such binders are disclosed in U.S. Pat. No. 4,985,163, to which incorporation by reference is expressly made. It is preferable to use borides of aluminum, of titanium, of zirconium, of calcium, silicides, such as calcium silicide and calcium aluminum silicide, in particular boron carbide. Examples of further constituents are basic oxides, in particular magnesium oxide, calcium oxide or barium oxide.

The thermal insulation molding according to the invention is produced by means of a process which is useful for the production of such moldings. The process preferably comprises the following process steps:

I. Compressing the thermal insulation mixture based on the abovementioned components into the desired shape at pressures of 8 to 20 bar, the thickness of the resulting shapes preferably being 10 to 35 mm, in particular 10 to 15 mm.

II. If appropriate, heating the compressed body at temperatures of 500 to 980° C. (hardening process).

The thermal insulation moldings according to the invention are used in all areas in which microporous thermal insulation moldings have hitherto also been used. For example these moldings are useful as a thermally insulating shaped part in radiation heating units for heating a plate, in particular a glass-ceramic plate, in radiation heaters of furnaces or ovens, in particular baking ovens, in heating radiators or in halogen radiators or other applications at temperatures up to 1200° C. which are operated with high heat-up rates (>100 K/min).

DETAILED DESCRIPTION OF PREFERRED EMBODIMENTS

The following examples serve to further explain the invention. In these examples, each percent by weight is based upon the total weight of the thermal insulation molding.

COMPARATIVE EXAMPLE

A thermal insulation mixture with a composition of
55% by weight of pyrogenically produced silica (commercially available as HDK® N25 from Wacker-Chemie, Munich);
41.5% by weight of zirconium silicate;
3% by weight of textile glass fibers (commercially available as Asil fibers 6 mm from Asglawo in Freiberg); and
0.5% by weight of boron carbide,
was pressed into a shaped part with a diameter of 198 mm, a thickness of 13 mm and a density of 320 kg/m$^3$ and was treated in a furnace for one hour at 800° C.

The molding obtained was stored for 180 hours at 30° C. in 93% relative atmospheric humidity. The water absorption was 19% by weight, based on the starting weight of the molding.

EXAMPLE 1

A thermal insulation mixture with a composition of
35% by weight of pyrogenically produced silica (commercially available as HDK® N25 from Wacker-Chemie, Munich);
20% by weight of electric-arc silica (commercially available as Microfume NDTC from Pechiney, Dusseldorf);
5% by weight of Al$_2$O$_3$;

37.5% by weight of zirconium silicate;

2% by weight of textile glass fibers (commercially available as Asil fibers 6 mm from Asglawo in Freiberg); and 0.5% by weight of boron carbide, was processed in the same way as in the Comparative Example to form a molding with a density of 320 kg/m$^3$ and was stored in the climatic cabinet. The water absorption was 9% by weight based upon the starting weight of the molding.

EXAMPLE 2

A thermal insulation mixture with a composition of

30% by weight of pyrogenically produced silica (commercially available as HDK® S 13 from Wacker-Chemie, Munich);

25% by weight of electric-arc silica (commercially available as Microfume NDTC from Pechiney, Düsseldorf);

30.5% by weight of silicon carbide available as MAW from Wacker-Chemie, Munich;

3.0% by weight of textile glass fibers (commercially available as Belcotex from Belchem);

10% by weight of Al$_2$O$_3$; and 1.5% by weight of cellulose fibers (commercially available as Arbocell FIF 400 from J. Rettenmaier GmbH in Ellwangen)

was processed in the same way as in the Comparative Example to form a molding with a density of 320 kg/m$^3$ and was stored in the climatic cabinet. The water absorption was 5% by weight based upon the starting weight of the molding.

Accordingly, while a few embodiments of the present invention have been shown and described, it is to be understood that many changes and modifications may be made thereunto without departing from the spirit and scope of the invention as defined in the appended claims.

What is claimed is:

1. A thermal insulation molding having a density of 150 to 500 kg/m$^3$, comprising a thermal insulation material, containing 5%–75% by weight of pyrogenic silica, 5% to 50% by weight of electric-arc silica, 5% to 50% by weight of opacifier, wherein the electric-arc silica has a bulk density of <200 kg/m$^3$, a carbon content of <0.1% by weight, an alkali metal oxide content of <0.2% by weight, an alkaline-earth metal oxide content of <0.3% by weight, an SO$_3$ content of <0.05% by weight and a specific surface area of >30 m$^2$/g; and wherein each percent by weight is based upon the total weight of the thermal insulation molding.

2. The thermal insulation molding as claimed in claim 1, wherein the electric-arc silica has a bulk density of 70 kg/m$^3$ to 190 kg/m$^3$, a carbon content of 0% to 0.05% by weight, an alkali metal oxide content of 0.02% to 0.18% by weight, an alkaline-earth metal oxide content of 0.05% to <0.3% by weight, an SO$_3$ content of 0% to <0.05% by weight and a specific surface area of >30 to 48 m$^2$/g; and wherein each percent by weight is based upon the total weight of the thermal insulation molding.

3. A process for producing a thermal insulation molding having a density of 150 to 500 kg/m$^3$, which comprises compressing at a pressure of 8 to 20 bar a thermal insulation mixture of material, containing 5%–75% by weight of pyrogenic silica, 5% to 50% by weight of electric-arc silica, 5% to 50% by weight of opacifier, wherein the electric-arc silica has a bulk density of <200 kg/m$^3$, a carbon content of <0.1% by weight, an alkali metal oxide content of <0.2% by weight, an alkaline-earth metal oxide content of <0.3%, by weight, an SO$_3$ content of <0.05% by weight and a specific surface area of >30 m$^2$/g, to produce said molding having a thickness of 10 to 35 mm; and wherein each percent by weight is based upon the total weight of the thermal insulation molding.

4. The process of claim 3, wherein the thickness of the molding is from 10 to 15 mm.

5. The process of claim 3, further comprising heating the molding at a temperature of 500° C. to 980° C.

6. The process of claim 3, wherein the electric-arc silica has a bulk density of 70 kg/m$^3$ to 190 kg/m$^3$, a carbon content of 0% to 0.05% by weight, an alkali metal oxide content of 0.02% to 0.18% by weight, an alkaline-earth metal oxide content of 0.05% to <0.3% by weight, an SO$_3$ content of 0% to <0.05% by weight and a specific surface area of >30 to 48 m$^2$/g; and wherein each percent by weight is based upon the total weight of the thermal insulation molding.

7. In a method for providing a thermally insulating shaped part in radiation heating units for heating a plate, the improvement which comprises, utilizing the thermal insulation molding as claimed in claim 1, as said thermally insulating shaped part in said radiation heating units for heating the plate.

8. In a method for providing a thermally insulating shaped part in radiation heaters for furnaces or ovens, the improvements which comprises, utilizing the thermal insulating molding as claimed in claim 1, as said thermally insulating shaped part in said radiation heaters for furnaces or ovens.

9. In a method for providing a thermally insulating shaped part in heating radiators, the improvement which comprises, utilizing the thermal insulation molding as claimed in claim 1, as said thermally insulating shaped part in said heating radiators.

10. In a method for providing a thermally insulating shaped part in halogen radiators, the improvement which comprises, utilizing the thermal insulation molding as claimed in claim 1, as said thermally insulating shaped part in said halogen radiators.

11. In a method for providing a thermally insulating shaped part at temperatures up to 1200° C. which are operated with high heat-up rates >100 K/min, the improvement which comprises, utilizing the thermal insulation molding as claimed in claim 1, as said thermally insulation shaped part at temperatures up to 1200° C. which are operated with high heat-up rates >100 K/min.

* * * * *